(12) United States Patent
Speh et al.

(10) Patent No.: US 7,699,400 B2
(45) Date of Patent: Apr. 20, 2010

(54) SEATING APPARATUS, AND IN PARTICULAR VEHICLE OR AIRCRAFT SEATING APPARATUS

(75) Inventors: Andreas Speh, Ummendorf (DE); Oliver Schweizer, Lindenberg (DE); Jürgen Baumann, Bodman-Ludwigshafen (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 0 days.

(21) Appl. No.: 11/783,442

(22) Filed: Apr. 10, 2007

(65) Prior Publication Data

US 2008/0169694 A1  Jul. 17, 2008

(30) Foreign Application Priority Data

Jan. 16, 2007  (EP)  .................. 07000737

(51) Int. Cl.
*B60N 2/00* (2006.01)
*A47C 7/02* (2006.01)

(52) U.S. Cl. .................. 297/452.18; 297/342

(58) Field of Classification Search ............ 297/452.18, 297/216.1, 342, 300.4, 216.15, 216.16; 244/118.6, 244/122 R; 248/188.1
See application file for complete search history.

(56) References Cited

U.S. PATENT DOCUMENTS

| 5,209,548 | A | * | 5/1993 | Locher | .................. 297/300.4 |
| 5,454,624 | A | * | 10/1995 | Anglade et al. | ........ 297/354.13 |
| 6,220,669 | B1 | * | 4/2001 | Frohnhaus et al. | ..... 297/452.18 |

FOREIGN PATENT DOCUMENTS

| DE | 10 2005 022 694 | | 11/2006 |
| DE | 10 2005 022 694 | A1 | 11/2006 |
| EP | 0 336 852 | A1 | 10/1989 |
| FR | 976 199 | A | 3/1951 |

OTHER PUBLICATIONS

European Search Report mailed on Jul. 2, 2007 in connection with corresponding EP application No. 07000737.2-2422.

* cited by examiner

*Primary Examiner*—Milton Nelson, Jr.
(74) *Attorney, Agent, or Firm*—Posz Law Group, PLC

(57) ABSTRACT

A seating apparatus, and in particular a vehicle or aircraft seating apparatus, includes a seat base bearing unit which is provided in order to mount a seat base in a movable manner. The seat base bearing unit comprises at least one movably mounted stiffening member which has at least two coupling points in the transverse direction of the seat base bearing unit.

21 Claims, 3 Drawing Sheets

SEATING APPARATUS, AND IN PARTICULAR VEHICLE OR AIRCRAFT SEATING APPARATUS

TECHNICAL FIELD

The invention relates generally to a seating apparatus, and more specifically to a seating apparatus for a vehicle or aircraft.

BACKGROUND

DE 10 2005 022 694 A1 discloses a generic seating apparatus with a seat base bearing unit which is provided in order to mount a seat base in a movable manner. However, in such an apparatus it is always desirable to reduce weight, components, costs and/or outlay on the installation.

SUMMARY

The invention is based on a seating apparatus, and in particular a vehicle or aircraft seating apparatus, with a seat base bearing unit which is provided in order to mount a seat base in a movable manner.

The seat base bearing unit may comprise at least one movably mounted stiffening means which has at least two coupling points in the transverse direction of the seat base bearing unit. "Transverse direction of the seat base bearing unit" is to be understood here as meaning, in particular, a direction which has at least one component from one seat base side region into a second seat base side region and/or in particular at least one component parallel to a seat base front edge. "Coupling point" is to be understood as meaning, in particular, a point which is provided in order to connect the stiffening means to a corresponding component. "Movable mounting" of the stiffening means is to be understood, in particular, as meaning that the stiffening means is provided in order, during movement of the seat base bearing unit, to execute at least one movement relative to a bearing means of the seat base bearing unit. Furthermore, "provided" is to be understood as meaning, in particular, specially equipped and/or designed.

An appropriate configuration makes it possible to save weight, components, costs and/or outlay on the installation. In particular, a fixing unit can be provided, the fixing unit being provided in order to lock the seat base bearing unit in at least one position and having just one individual fixing means which is arranged on one side, in particular in an individual, first seat base side region. A fixing means in a second seat base side region can be avoided and therefore components, weight, costs and outlay on installation can be saved.

In a further exemplary configuration of the invention, the stiffening means may extend from a first seat base side region over a central seat base region into an opposite second seat base side region, as a result of which the two seat base side regions can advantageously be coupled via the stiffening means and forces and/or moments acting on the one seat base side region can be transmitted to the other seat base side region by means of the stiffening means and stiffening can therefore be achieved.

Furthermore, the stiffening means may be formed by a torsion rod which is provided in order to transmit a torsional moment, thus making it possible to obtain an advantageous force flux. Furthermore, with a stiffening means formed by a torsion rod, a force introduced at the one seat base side region can be transmitted in a particularly space-saving manner to the second seat base side region.

The stiffening means can furthermore be integrated in a particularly space-saving manner and an advantageous force flux can be achieved if the stiffening means is coupled to at least one movably mounted lever of the seat base bearing unit and preferably couples two movably mounted levers of the seat base bearing unit to each other, and, in particular, if the stiffening means is connected in a rotationally fixed manner to at least one lever and/or the stiffening means is arranged coaxially with a pivot axis of a lever of the seat base bearing unit.

The stiffening means is preferably formed by a tube, thus making it possible to achieve a component with a high degree of rigidity, in particular with a high degree of torsional rigidity, and a low weight, which component is advantageously suitable for transmitting a torque or torsional moment, especially if the component is designed with a round cross-sectional area.

If the stiffening means is provided in order to stiffen a backrest unit, weight, components, costs and/or outlay on installation can furthermore be saved, especially by at least two kinematic parts of a backrest kinematic unit, via which the backrest unit is coupled to a seat frame, being coupled via the stiffening means. The backrest unit can thereby be of particularly lightweight design and nevertheless a high degree of rigidity against distortion can be achieved.

Such a lightweight seating apparatus is suitable in particular for an aircraft seat. However, in principle, it can also be used, as can be recognized by one skilled in the art, for motor vehicle seats, seats for lecture halls, and the like.

BRIEF DESCRIPTION OF THE DRAWINGS

Further advantages are revealed in the following description of the drawings, which illustrate an exemplary embodiment of the invention. The drawings, the description and the claims contain numerous features in combination. A person skilled in the art will expediently also consider the features individually and put them together to form meaningful further combinations.

In the drawings.

DETAILED DESCRIPTION

Figure 1:
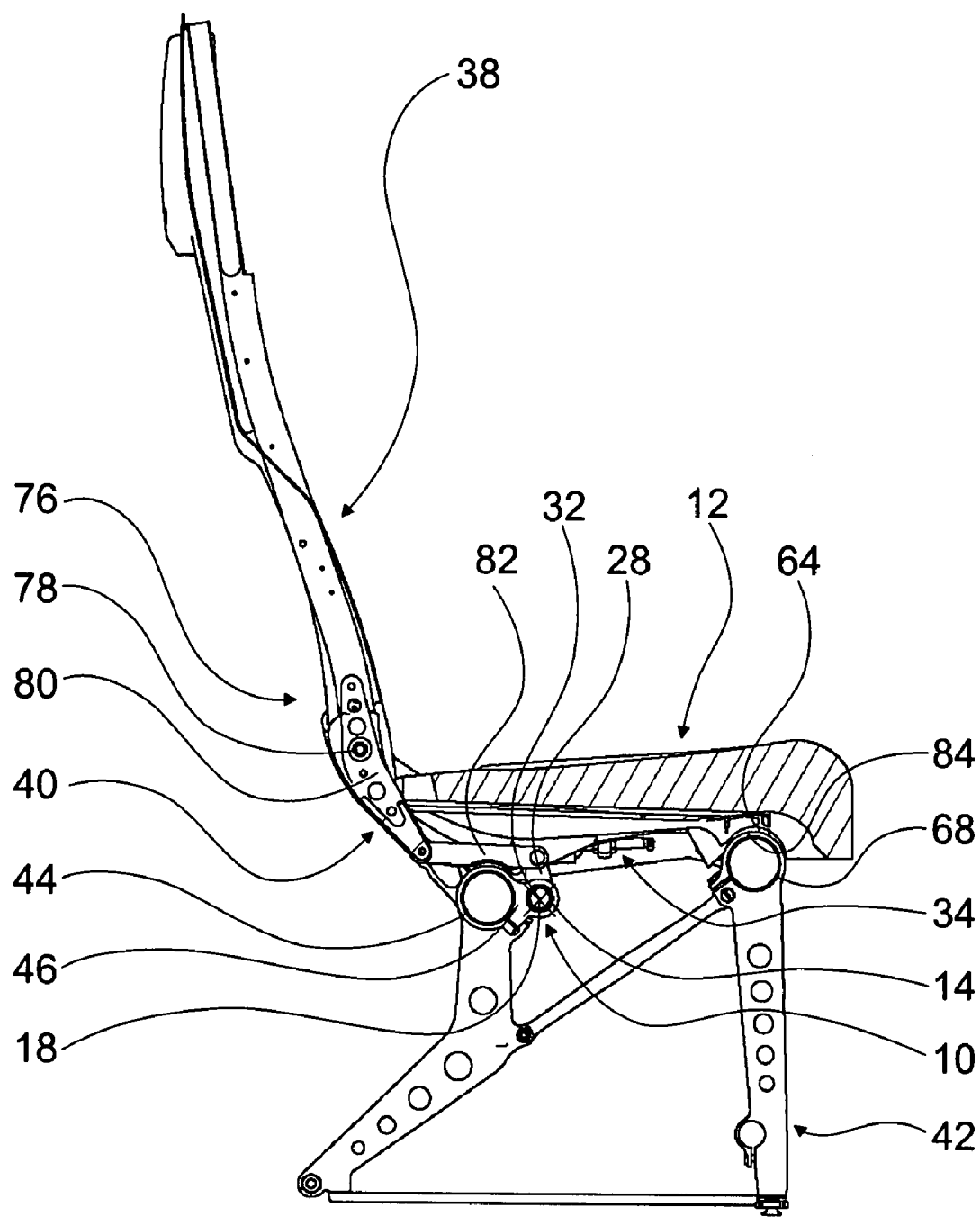
FIG. 1 shows a schematically illustrated aircraft seat in a side view with a seating apparatus in a first position.
Figure 2:
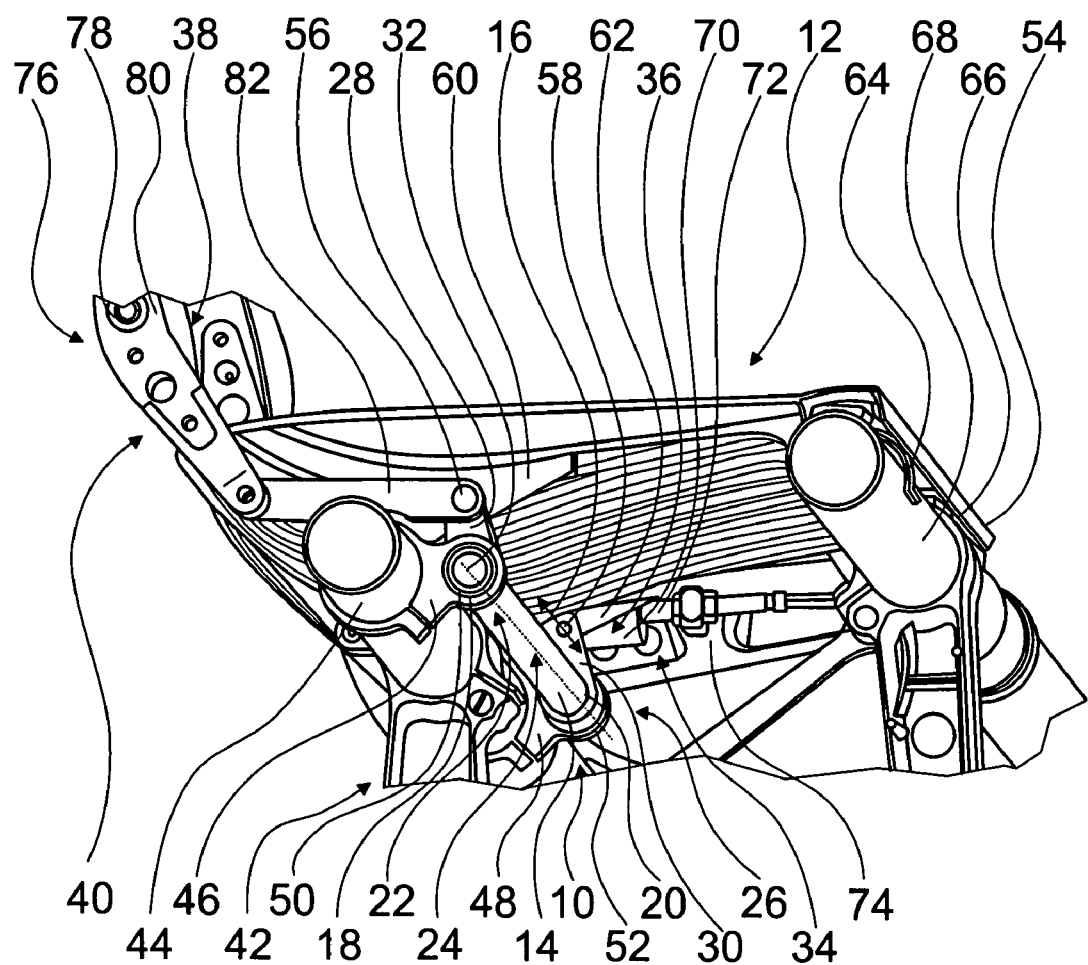
FIG. 2 shows a cutout of the aircraft seat obliquely from below.
Figure 3:
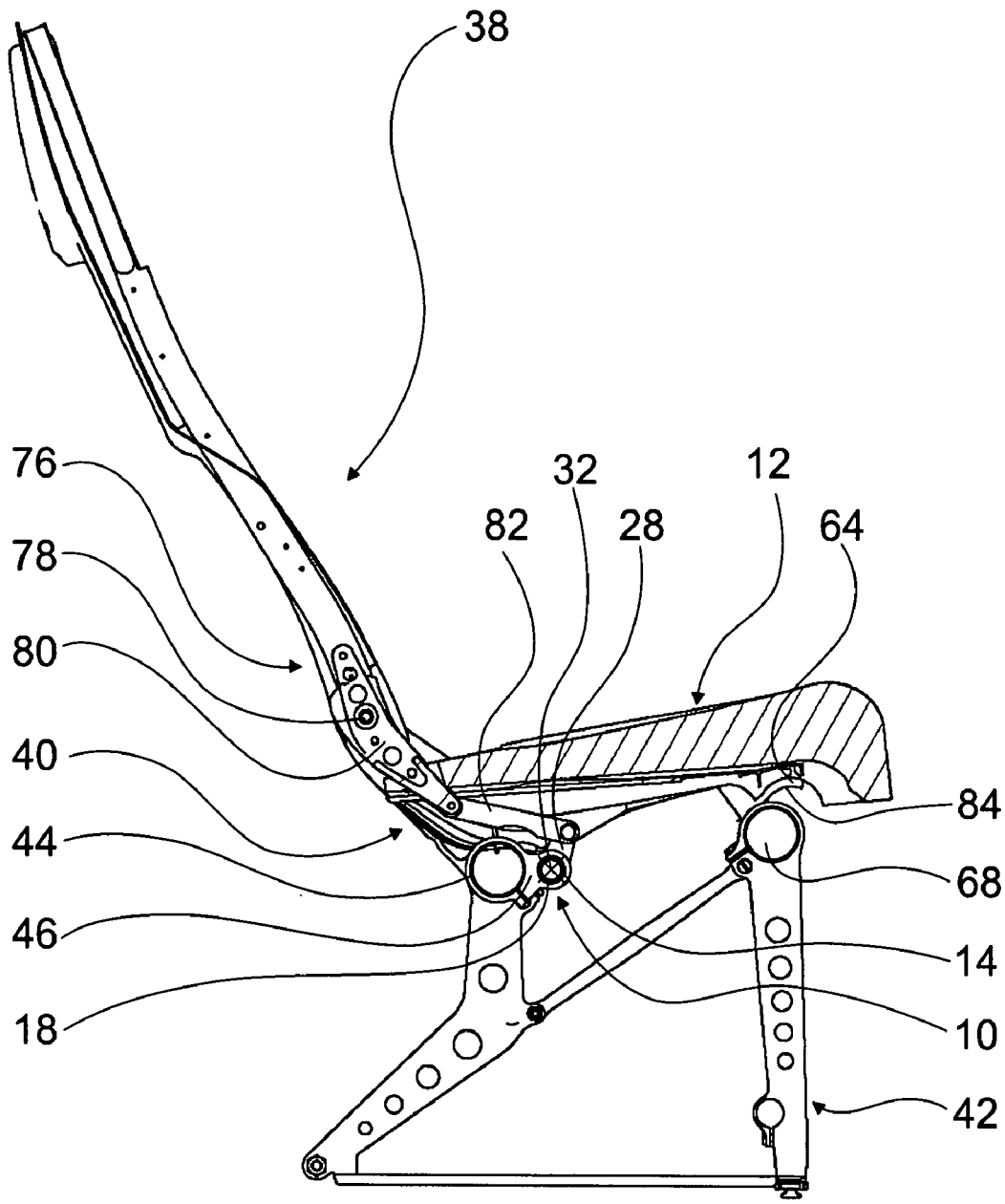
FIG. 3 shows the aircraft seat in side view in a second position.

FIGS. 1-3 show a schematically illustrated aircraft seat in a side view with a seating apparatus which comprises a seat base bearing unit 10 which is provided in order to mount a seat base 12 of the aircraft seat in a movable manner. The seat base 12 is connected via the seat base bearing unit 10 to a seat frame 42, which is provided in order to be placed onto an aircraft cabin floor.

The seat base bearing unit 10 comprises a movably mounted stiffening means 14, which extends in the transverse direction 16 of the seat base bearing unit 10 or parallel to a seat base front edge 54 from a first seat base side region 22 over a central seat base region 24 into a second seat base side region 26 opposite the first seat base side region 22, and has two coupling points 18, 20 (FIG. 2). The stiffening means 14 is formed by a tubular torsion rod with a round cross section, which is provided in order to transmit a torsional moment. A first bearing means 46 is fastened in the first seat base side region 22, and a second bearing means 48 is fastened in the second seat base side region 26, to a rear supporting tube 44 running in the transverse direction 16, the bearing means respectively forming a bearing point 50, 52, in which the stiffening means 14 is rotatably mounted.

The seat base bearing unit 10 has a first lever 28, which is connected in a rotationally fixed manner to the stiffening means 14 in the first coupling point 18 in the first seat base side region 22, and a second lever 30, which is connected in a rotationally fixed manner to the stiffening means 14 in the second coupling point 20 in the second seat base side region 26. The two levers 28, 30 are coupled to each other or are connected in terms of drive via the stiffening means 14. The levers 28, 30 are mounted pivotably about a pivot axis 32 by the stiffening means 14, wherein the stiffening means 14 is arranged coaxially with the pivot axis 32. The levers 28, 30 are connected pivotably via hinge pins 56, 58 to fastening tabs 60, 62 integrally formed on a lower side of the seat base 12. The seat base 12 is additionally supported in its rear region on the supporting tube 44 and in its front region on a front supporting tube 68 via clips 64, 66 latched into the seat base 12.

Furthermore, the seating apparatus comprises a fixing unit 34 which is provided in order to lock the seat base bearing unit 10 in a plurality of positions, wherein the fixing unit 34 has an individual fixing means 36 arranged only in the second seat base side region 26. A fixing means of the fixing unit 34 is not arranged in the first seat base side region 22. The fixing means 36 comprises a piston which is guided in a hydraulic cylinder 70, is connected pivotably to a support part 74 of the seat frame 42 via a piston rod 72 and is supported on the said support part while the hydraulic cylinder 70 is fixedly connected pivotably to the lever 30 and is supported thereon.

As shown in FIGS. 1-3, the seating apparatus comprises a backrest unit 38 and a backrest kinematic unit 40 via which the backrest unit 38 is coupled to the seat frame 42, wherein the stiffening means 14 is provided in order to stiffen the backrest unit 38. The backrest kinematic unit 40 has a lever mechanism 76 which is formed essentially mirror-symmetrically with respect to a central axis, with essentially just one side of the lever mechanism 76 being visible in the figures. The lever mechanism 76 has, laterally in each case, a first lever 80 which is connected rigidly to the backrest unit 38 and is pivotable about a pivot axis 78. The laterally arranged levers 80 are each connected pivotably to an intermediate lever 82 or a coupler, which intermediate levers or couplers are each coupled via the hinge pins 56, 58 to the levers 28, 30 and via the levers 28, 30 to the stiffening means 14. The levers 28, 30 and the stiffening means 14 are therefore part of the backrest kinematic unit 40, and the backrest kinematic unit 40 and the seat base bearing unit 10 are partially designed as a single piece.

If a manual load occurs in a side region of the backrest unit 38, the said load is transmitted as a torque or torsional moment via the levers 80, 82, 28 facing the side region to the stiffening means 14 and via the stiffening means 14 to the opposite side region of the backrest unit 38. As a result, the backrest unit 38 is inherently stiffened compared to a configuration without the stiffening means 14.

If the backrest unit 38 is moved from an essentially upright position (cf. FIG. 1) into a rearwardly inclined position (cf. FIG. 2) by a passenger, the levers 28, 30 are pivoted forwards and the seat base 12 slides on the supporting tubes 44, 68 forwards and, because of a corresponding contour of the seat base 12 downwards. In addition, the clips 64, 66 have a ramp-like contour 84 such that the movement forwards additionally causes the seat base 12 to be guided upwards in its front region. The seat base 12 therefore executes a combined movement, to be precise a translatory and a rotatory movement. If a desired position is reached, the backrest unit 38 and the seat base 12 are fixed in position by the fixing unit 34.

The invention is described herein in detail with particular reference to presently preferred exemplary embodiments. However, it will be understood that variations and modifications can be effected within the scope and spirit of the invention.

The invention claimed is:

1. A seating apparatus, comprising:
   a seat frame provided for affixing the seating apparatus to a floor;
   a seat base mounted on the seat frame;
   a seat base bearing unit separate from the seat base for mounting the seat base on the seat frame in a movable manner relative to the seat frame;
   a backrest unit separate from the seat base and coupled to the seat frame, wherein
   the seat base bearing unit comprises at least one stiffening means provided for stiffening the backrest unit, the stiffening means being movably mounted relative to the seat frame, wherein the stiffening means includes a pivot axis about which the stiffening means rotates and at least two coupling points oriented in a transverse direction relative to the seat base bearing unit, and wherein movement of the stiffening means about the pivot axis effects a movement of the seat base relative to the seat frame and vice versa; and
   a back rest kinematics unit coupled to the coupling points of the stiffening means and connected to the seat base for inclining the backrest unit relative to the seat frame, wherein the seat base is movable in a forward direction if the backrest unit is moved from an essentially upright position to a rearwardly inclined position.

2. A seating apparatus according to claim 1, wherein the stiffening means extends from a first seat base side region over a central seat base region into an opposite second seat base side region.

3. A seating apparatus according to claim 1, wherein the stiffening means is formed by a torsion rod provided in order to transmit a torsional moment.

4. A seating apparatus according to claim 1, wherein the seat base bearing unit further comprises at least one movably mounted lever to which the stiffening means is coupled.

5. A seating apparatus according to claim 4, wherein the seat base bearing unit further comprises at least two movably mounted levers which are coupled to each other via the stiffening means.

6. A seating apparatus according to claim 4, wherein the stiffening means is connected in a rotationally fixed manner to the at least one lever of the seat base bearing unit.

7. A seating apparatus according to claim 1, wherein the stiffening means is arranged coaxially with a pivot axis of a lever of the seat base bearing unit.

8. A seating apparatus according to claim 1, wherein the stiffening means is formed by a tube.

9. A seating apparatus according to claim 1, further comprising a fixing unit for locking the seat base bearing unit in at least one position, wherein the fixing unit has an individual fixing means arranged on one side.

10. A seating apparatus according to claim 1, wherein at least two kinematic parts of the back rest kinematics unit are coupled to each other via the coupling points of the stiffening means, the kinematic parts having each at least a coupling point to which the seat base is coupled.

11. A seating apparatus according to claim 10, wherein an axis through the coupling points by which the at least two kinematic parts of the backrest kinematics unit are coupled to the seat base, and the pivot axis of the stiffening means have a distance that is invariable during a movement of the seat base relative to the seat frame.

12. A seating apparatus according to claim 1, wherein at least two kinematic parts of the back rest kinematics unit are coupled to each other via the coupling points of the stiffening means, the kinematic parts in cooperation with the stiffening means comprising the seat base bearing unit.

13. A seating apparatus according to claim 1, wherein at least two kinematic parts of the backrest kinematic unit are coupled via the stiffening means.

14. A seating apparatus according to claim 1, wherein at least two levers of the back rest kinematics unit are coupled to each other via the coupling points of the stiffening means, the levers being connected pivotally to the seat base.

15. A seating apparatus according to claim 14, wherein the levers are forwardly pivotable, and the seat base is simultaneously movable in the forward direction and a downward direction, if the backrest unit is moved from the essentially upright position into the rearwardly inclined position.

16. A seating apparatus according to claim 15, further comprising supporting tubes for supporting the seat base to enable the seat base to slidably move on the supporting tubes.

17. A seating apparatus according to claim 16, wherein the stiffening means is placed between the supporting tubes.

18. A seating apparatus according to claim 15, further comprising a ramped contour such that the forward movement of the seat base causes the seat base to be guided upward in its front region.

19. A seating apparatus according to claim 18, wherein the ramped contour is formed in part by clips for supporting the seat base on the supporting tubes.

20. A seating apparatus according to claim 14, wherein the levers are connected via hinge pins to fastening tabs of the seat base.

21. A seating apparatus according to claim 20, wherein the fastening tabs are integrally formed on a lower side of the seat base.

\* \* \* \* \*